UNITED STATES PATENT OFFICE.

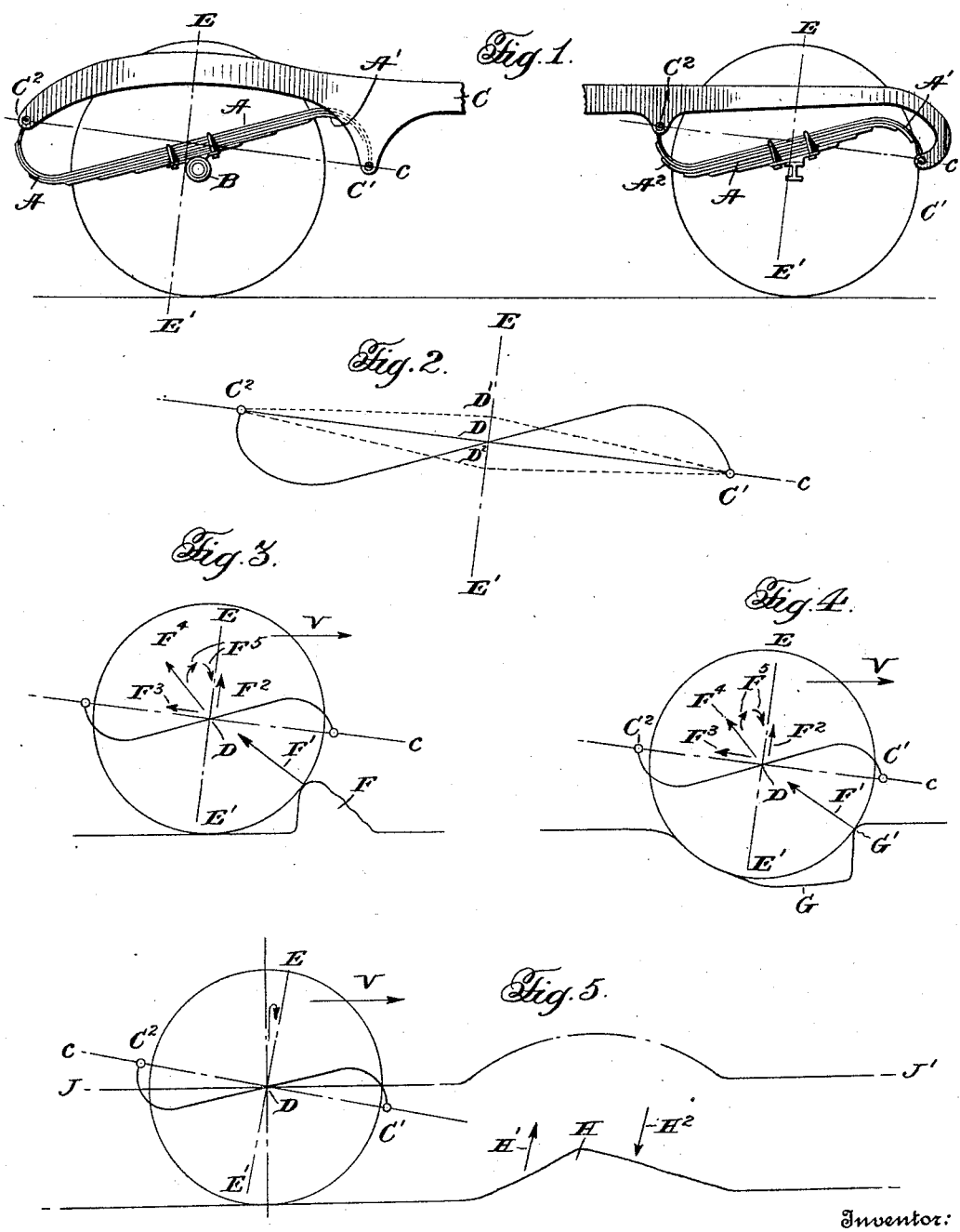

JAMES DE WITT HILL, OF SCOTTDALE, PENNSYLVANIA.

VEHICLE SPRING.

1,411,885.    Specification of Letters Patent.    Patented Apr. 4, 1922.

Application filed July 15, 1919. Serial No. 310,963.

*To all whom it may concern:*

Be it known that I, JAMES D. HILL, a citizen of the United States, residing at Scottdale in the county of Westmoreland and State of Pennsylvania, have invented certain new and useful Improvements in Vehicle Springs, of which the following is a specification, reference being had therein to the accompanying drawing.

My present invention relates to vehicle springs, and more particularly to an improved type of spring especially adapted to automobiles, the object of my invention being to provide an automobile spring which will improve the riding qualities of the car to which it is fitted, which will eliminate all necessity for shock absorbers, recoil checks, or other auxiliary apparatus or devices, and which will, on account of its tendency to keep the wheels in rolling contact with the road, reduce the wear, and which will be simple, strong, and durable and may be manufactured at a moderate cost.

These objects are preferably carried out by the construction of spring to be now described with reference to the accompanying drawings, forming a part of this specification, and wherein—

Figure 1 is a side view illustrating my improved frame in its application to a rear wheel and axle, and also to the front wheel and axle, the frame being broken away between the front and rear wheels, and Figures 2 to 5 inclusive are diagrams illustrating certain relative movements of the parts in operation as hereinafter particularly referred to.

Referring now particularly to Figure 1, the spring as proposed by my invention and utilized at either the front or rear portion of an automobile, is composed of a main leaf of somewhat the general shape of the letter S, with an eye at each extremity, and with a number of other leaves graded and formed so as to reinforce the main leaf and promote the desired flexibility and strength.

The main body portion A of the spring is substantially straight and connected at substantially its center to the axle B in each instance, and is as shown, inclined with respect to said axle at an angle substantially 12 to 20° with the horizontal, and with its forward end uppermost. The forward and rear end portions $A'$ and $A^2$ of the body portion A of the spring are curved as shown, substantially on the arc of a circle and in respectively opposite directions, the front end portion $A'$ being turned downwardly and the rear portion $A^2$ being turned upwardly.

The attaching eyes before mentioned are carried at the ends of the curved portions $A'$ and $A^2$ and have bearings upon the body C of the vehicle at points $C'$ and $C^2$ which are vertically spaced with respect to one another. In other words, the bearing point $C'$ of the forward end of the spring is in a horizontal plane below that of the bearing point $C^2$ of the rear end of the spring, it being noted that the intermediate connection of the body A with the axle B is in the plane of the connected extremities of the end portions, or in other words, a line drawn through the bearing points $C'$ and $C^2$ as the broken line $c$.

The spring thus formed is so proportioned that, with the car at rest and loaded to normal capacity, there is no tension between the points $C'$ and $C^2$. In other words, the forces acting upon the points $C'$ and $C^2$ are vertical and leave no horizontal components.

It is intended in use that the driving power be applied through the springs as shown, either from one or both of the axles.

Thus with a spring constructed as described and shown, rebound or relative movement of the parts away from one another after active operation of the spring, is checked in a manner which will now be described in connection with Figure 2. In this figure, the distances $C'$ $D'$, $C^2$ and $C'$, $D^2$, $C^2$ are greater as shown than the distance $C'$, D, $C^2$ along the line $c$, and hence any movement of the normal center point of the spring at D, either up or down, is opposed by the tension set up between the fixed bearing points $C'$ and $C^2$, and thus the action of the spring as constructed which tends to hold the point D, corresponding to the axle B in Figure 1, in the line $c$ between bearing points $C'$ and $C^2$, forms an effective rebound or recoil check.

In the normal action, since the length of the spring itself, that is, the length of the body A and curved end portions $A'$ and $A^2$, is much greater than the distance between the bearing points $C'$ and $C^2$ along line $c$, there is a range of comparatively free action between the points $D'$ and $D^2$ in Figure 2 particularly. With the swinging action, the path of the axle or point D will follow very closely the line E, $E'$, perpendicular to the line $c$ connecting the bearing points $C'$, $C^2$, and since line E, E' is for this reason not a vertical line, bearing point C'' being below the horizontal plane of bearing point C² as before described, the axle B at the point D will travel forward and upward as D approaches D', and downward and rearward as D approaches D². This is true in connection with all vertical or nearly vertical impulses to the axle, such as are received as the car travels over a moderately rough road.

In extreme cases, one of which is illustrated in Figure 3, where the wheel strikes a considerable obstacle F in the roadway, the reactionary force along the line F' resolves itself into the components F² along line E, E' and F³ along the line c, and since the spring is flexible in both of these directions, the point D will be displaced in the direction of the resultant F⁴. As the wheels pass over the obstacle and F' approaches the vertical direction, point D will swing over toward line E, E' and will finally return along this line which is its normal path of travel, to the starting point as indicated by the arrows F⁵.

Likewise, as shown in Figure 4, when the wheel drops into a bad break or excavation in a roadway, or pavement, another example of the extreme case is presented, in which the point D is displaced rearwardly from its normal movements along line E, E'. In this case, as the wheel drops into the excavation or rut G, the axle at point D, follows the normal path along lines E, E', and since this movement carries the axle backward as well as downward, its velocity in the direction of travel indicated by the arrow V in Figures 3, 4 and 5, is reduced. This action serves to reduce the force of the impact at the opposite side of the rut at G' upon contact with which, the action follows the same as in Figure 3.

In the action of the spring furthermore, a rolling contact between the wheel and the roadway surface is maintained at all times and tire wear or abrasion is considerably reduced for this reason.

Referring now to Figure 5 in this connection, the car body, if travelling with its uniform velocity along a straight line in the direction indicated by the arrow V, encounters an obstruction or elevation H, with the motor clutch disengaged, any change under these conditions in the angular velocity of the wheel must be brought about by means of the momentum of the body and frictional contact between the wheel and the roadway surface. It follows, therefore, that if any sudden change in this velocity is to be brought about, it should occur while the pressure between the wheel and the roadway surface is decidedly firm, if sliding and abrasion of the tire are to be avoided. In Figure 5 the broken line J, J' is the path of the axle or of the point D, determined from the contour of the roadway surface. The distances travelled by the tread of the wheel and the axle J along the roadway and the line J, J' are of course greater than if there were no obstruction, and hence the angular velocity of the wheel and the linear velocity of the axle must be increased to make up for the extra distance travelled.

As the wheel strikes and rolls over the obstruction H, its pressure on elevation upon the near side of the obstruction, is naturally greater than it is upon the far side, and since the axle is carried forward as it is forced upward, action being along the line E, E' as described in connection with Figure 2, the necessary increase in the angular velocity of the wheel will be acquired, and this as the wheel travels up the near side of the obstruction, where the pressure is firm enough to prevent slipping of the tire. Then having attained the required increase of velocity, it will roll down the far side of the obstruction even though the pressure is comparatively light. The arrows H' and H² indicate the action of the spring in passing over the obstruction.

I am, therefore, by the particular construction of spring proposed, enabled to obviate many of the difficulties, and do away with many of the disadvantages, encountered in automobile travel, as well as to reduce friction and minimize tire abrasion and wear.

I claim:—

1. A vehicle spring comprising a substantially straight body portion intermediately connected to the vehicle axle and inclined with respect to the horizontal, and curved end portions extending in respectively opposite directions from the ends of the body portion, and connected at their extremities to immovable portions of the vehicle body at vertically spaced points both above the axle.

2. A vehicle spring comprising a substantially straight body portion intermediately connected to the vehicle axle and inclined with respect to the horizontal, and end portions at opposite ends of the body curved in respectively opposite directions and connected at their extremities to immovable portions of the vehicle body at vertically spaced points both above the axle.

3. A vehicle spring comprising a substantially straight body portion intermediately connected to the vehicle axle and inclined with respect to the horizontal and with its forward end uppermost, and end portions at opposite ends of said body portion, curved in respectively opposite directions, and having their extremities connected to immovable portions of the vehicle body at vertically spaced points both above the axle.

4. A vehicle spring comprising a substantially straight body portion intermediately connected to the vehicle axle and inclined with respect to the horizontal with its forward end uppermost, and end portions of which the forward end portion is curved downwardly from the upper end of the body and the rear end portion is curved upwardly from the rear end of the body, the extremities of which curved end immovable portions are connected to portions of the vehicle body at vertically spaced points both above the axle.

5. A vehicle spring comprising a substantially straight body portion intermediately connected to the vehicle axle and inclined with respect to the horizontal, with its forward end uppermost, a rear upwardly curved end portion connected at its extremity to a portion of the vehicle body, and a forward end portion curved downwardly and connected at its extremity to a portion of the vehicle body in a horizontal plane below that of the horizontal plane of the rear connected extremity.

6. A vehicle spring comprising a substantially straight body portion inclined with respect to the horizontal and downwardly and upwardly curved forward and rear end portions at the forward and rear ends respectively of the said body portion, connected at their extremities to portions of the body at vertically spaced points, the said body portion being intermediately connected to the vehicle axle in the plane of the connected extremities of said end portions, which plane is oppositely inclined to the inclination of the body portion.

7. In a vehicle spring suspension the combination with a wheel axle and a frame, of a bracket carried by said axle and having a supporting face inclined from the horizontal; a spring having a straight body secured at its longitudinal center upon the inclined face of the bracket and having oppositely curved ends with the forward end of the body uppermost and its terminal end downwardly curved and connected to an immovable portion of the vehicle above the axle, the rear of the body projecting below the axle and having an upwardly curved end connected to an immovable part of the vehicle above the axle.

In testimony whereof I affix my signature in presence of two witnesses.

JAMES DE WITT HILL.

Witnesses:
VICTOR VERNON,
JOHN J. WARD.